United States Patent [19]

Grzymek et al.

[11] 4,149,898
[45] Apr. 17, 1979

[54] METHOD FOR OBTAINING ALUMINUM OXIDE

[75] Inventors: Jerzy Grzymek, Warsaw; Anna Derdacka; Zofia Konik, both of Kraków-Nowa-Huta; Bronisław Werynski, Ópole, all of Poland

[73] Assignee: Akademia Gorniczo-Hutnicza Im. Stanislawa Staszica, Cracow, Poland

[21] Appl. No.: 880,004

[22] Filed: Feb. 21, 1978

[30] Foreign Application Priority Data

Feb. 23, 1977 [PL] Poland .................... P-196191
Jan. 14, 1977 [PL] Poland .................... P-198894
Dec. 30, 1977 [PL] Poland .................... P-203581

[51] Int. Cl.$^2$ .............................................. C04B 7/24
[52] U.S. Cl. ...................................... 106/103; 423/625
[58] Field of Search ................. 106/103; 423/119, 625

[56] References Cited

U.S. PATENT DOCUMENTS

| 2,242,258 | 5/1941 | Noll | 423/119 |
|---|---|---|---|
| 3,642,437 | 2/1972 | Angstadt et al. | 106/103 |
| 3,776,717 | 12/1973 | Kapolyi et al. | 106/103 |
| 3,876,749 | 4/1975 | Horvath et al. | 423/119 |

Primary Examiner—James Poer
Attorney, Agent, or Firm—Haseltine, Lake & Waters

[57] ABSTRACT

A method for obtaining aluminum oxide where the smelted metallurgical slag is subjected to a slow cooling and then self-decomposition by simultaneous action of ultrasound or vibration of high frequency, carried out, which accelerates the formation, in a glassy (vitrous) phase, of a polymorphous, crystalline, high-temperature modification of calcium aluminate, 12 $CaO\cdot 7Al_2O_3$, which can be easily lixiviated with aqueous solutions of soda. From lye liquors after extraction, the aluminum oxide is then recovered and the residue, after lixiviation, is burnt to standard portland clinker keeping possibly the lowest proportion of the quantity of clinker produced in relation to the quantity of obtained aluminum oxide.

7 Claims, No Drawings

METHOD FOR OBTAINING ALUMINUM OXIDE

The object of the invention is to provide a method for obtaining aluminum oxide from metallurgical slags.

The known procedure for obtaining aluminum oxide according to the sintering-decomposition method by J. Grzymek described in Polish patent specifications Nos. 43,443 and 43,444 consists in grinding the aluminosilicate raw material with limestone and, subsequently, homogenized by treatment of with water, the raw material reducing burning or firing in a cement rotary kiln at a temperature which does not exceed 1300° C. The reduction process is carried out by limited air inflow using coal contained in the sintered mass. The process is carried out for the purpose of removing some noxious stabilizing contaminations (impurities), containing cations of high ionic potential. Under the influence of even neglibigle quantities of highly oxidized compounds contained in sintered mass which contain cations with a high ionic potential, such as: $As^{+5}$, $P^{+5}$, $B^{+3}$, $V^{+5}$, and $Cr^{+6}$ takes place the stabilization of a modification of the polymorphous phase $\beta 2CaO.SiO_2$ and, hence, limits the possibility of transformation of this phase into the modification, $\gamma 2CaO.SiO_2$. The phenomenon of the transformation of the polymorphous modification $\beta 2CaO.SiO_2$ to the modification, $\gamma$, is connected with the phase of self-decomposition of aluminum-containing sintered mass, containing considerable amounts (about 60%) of said calcium orthosilicate.

The stabilizing action on the phase, $\beta 2CaO.SiO_2$, also has a high temperature of burning, causing the formation of large quantities of the calcium-aluminate liquid phase, in which $\beta 2CaO.SiO_2$, partially dissolved therein loses, during cooling, its ability of transformation of low-temperature polymorphous $\gamma$-modification of calcium orthosilicate.

The aim of the invention is to provide a method for producing the aluminum oxide from metallurgical (blast-furnace) slag fused at higher temperature (1500° C.), which permits to isolate from its glassy polymorphous high-temperature phase, a crystalline modification of the twelfth-calcium aluminate $12CaO.7 Al_2O_3$, which is easy to lixiviate with aqueous solutions of soda, as well as to evolve the self-decomposing polymorphous phase, contained in slag, of the modification of calcium $\gamma$-orthosilicate to the end to recover the alumina.

Basing on the investigations carried out, it was proved, that the metallurgical slags rich in alumina, especially those formed during the smelting of iron, have a twice lower content of silica, when compared with self-decomposing furnace dust emission produced from alumino-silicate raw materials of lower content in aluminum oxide, which are used by the previous sintering-decomposition method revealed in Polish Pat. Nos. 43,443 and 43,444. The limited quantity of silica in said metallurgical slags has an influence on the content in calcium-orthosilicate in slag, decreasing it up to about 30% by weight. In the sintering-decomposition process used until now, as covered in the Polish patent specifications mentioned above, the amount of calcium orthosilicate in self-decomposing dust is above 60% by weight. The twice lower content of calcium orthosilicate and the twice higher content of the glassy or vitreous calcium aluminate phase in metallurgical slag obtained during smelting process of iron at high temperature of 1500° C., causes a limitation and even a full inhibition of the phenomenon of self-decomposition of slag being cooled. The limited self-decomposition of the slag decreases the ability for rapid and deeper extraction of aluminum oxide from the slag by help of soda solutions, which influences an important reduction of economic effects in obtaining aluminum oxide from metallurgical slags. For comparison it was shown that in the sintering-decomposition method by J. Grzymek, discussed above, the burnt agglomerate at temperature of 1300° C., after cooling, is spontaneously disintegrated in 95% by weight to grains with dimensions being below 30 microns, whereas the said metallurgical slag smelted at a temperature of about 1500° C. and after cooling and self-decomposition contains average grains with dimensions below 30 microns barely in the quantity of about 20% by weight.

Independently thereof, the aluminate phase which appeared in self-decomposing dust, produced according to the sintering-decomposition method of J. Grzymek, used till now, does not undergo any smelting and appears in the form of a crystalline aluminate phase, which is easy to lixiviate with an aqueous solution of soda at a temperature of 70° C., composed of $CaO.Al_2O_3$ and $12CaO.7Al_2O_3$, whereas in smelted metallurgical slags at a temperature of 1500° C., this phase appears in form of calcium aluminate, three times weaker for lixiviation, appearing in form of smelted and, subsequently, glassy (vitrified) calcium aluminate. In the case of the sintering-decomposition method of metallurgical slag previously mentioned above, as result of a limited grade of its self-decomposition, in spite of its large content in aluminum oxide, the lixiviating depth (ability) of $Al_2O_3$ from metallurgical slags with aqueous solutions of soda is limited, approximately, to 35% by weight. On the other hand, this lixiviating ability (lixiviating depth), basing on the used method, the sintering-decomposition by J. Grzymek, this lixiviating depth of aluminum oxide from aluminum oxide containing sinters or agglomerates burnt at about 1300° C. is of 75% by weight. The low lixiviating depth or ability of $Al_2O_3$ during extraction process of smelted, at 1500° C., and then vitrified metallurgical slags by means of aqueous solutions of soda, cancels any economic production of aluminum oxide. This economics are additionally made worse by the fact that the vitrified and not fully decomposed extraction residue requires additional grinding, contains high amounts of aluminum oxide, to that which might have been produced therefrom economically Portland cement of a quality corresponding to obligatory standards. On the other hand, it should be underlined here, that the metallurgical slags rich in aluminum oxide are a valuable raw material, thanks to the reduction process to those which underwent the smelting of iron in a blast-furnace, depriving them fully of the noxious impurities in form of cations with high ionic potential, thus stabilizing the process of self-decomposition of sinter (agglomerate) of calcium orthosilicate.

The essence of the invention is based on the fact that the smelted metallurgical slag is subjected to a slow cooling and its self-decomposition is carried out, optionally by the simultaneous action of ultrasonic vibration waves of high frequency, which accelerates the formation in the vitrified phase is lixiviating, the polymorphous, crystalline, high-temperature modification of calcium aluminate $12CaO.7Al_2O_3$ easily lixiviated with aqueous solutions of soda. From lye liquors of extraction, the aluminum oxide is then recovered, and the residue after extraction is burnt to a standard Portland clinker and maintaining the lowest proportion of produced clinker quantity in relation to the amount of produced aluminum oxide.

To obtain the aluminum oxide, the smelted metallurgical slag is used which was previously produced during the smelting iron process at temperature of 1500° C. The cooling of smelted slag is carried out from a temperature of 1350° C., but not faster than 10° per minute. After having cooled the slag to temperature below 700° C., it is subjected to the action of ultrasound or vibrations of high frequency. In this manner the resulting polymorphous, crystalline high-temperature modification $12CaO.7Al_2O_3$ is then advantageously lixiviated at temperature below 50° C.; moreover, the lixiviation is carried out using an aqueous solution of sodium carbonate at a concentration below 10% by weight. The residue after extraction prior to its burning to Portland clinker is mixed with complementary raw materials, commonly applied in the production of Portland clinker. As these complementary raw materials are used some additives, mainly containing components in form of calcium oxide, calcium carbonate, silica and optionally, iron oxides in form of pyrite cinders, are used; moreover, the kind and quantity of introduced additives depends on the chemical composition of the slags and depth of lixiviating process of $Al_2O_3$ from these slags. From the residue, after lixation of the raw material complemented with additives mentioned above, the Portland clinker is burnt in a cement burning kiln.

The application to the clinker production of the strongly dispersed residue after lixiviation, containing large amounts of $\gamma 2CaO.SiO_2$, instead of classical raw materials considerably reduces the costs of grinding, as well as the costs of clinker firing. Moreover, an increase of yield of rotary furnaces by 20–25% is achieved. The resulting Porland clinker is then ground to cement with other additives used in the cement industry. Achieving the required standard or quick efficiency Portland cement qualities of the manufactured product.

EXAMPLE I

Smelted metallurgical slag produced during iron smelting process at a temperature of 1500° C. is subjected to slow cooling from a temperature of 1350° C. to a temperature 600° C. with an average rate about 5° per minute. Subsequently, a temperature of 600° C. is maintained for one hour. Further cooling of the slag is carried out slowly at normal ambient temperature. As result of the cooling carried out there follows the self-decomposition of the slag amounting to 90%, which indicates, that on the sieve with the side length of 2 mm remain residues 10% by weight of this material. The content of grains of dimensions up to 30 microns in the self-decomposed sieved dust is about 40% by weight. The self-decomposed, sieved dust is then lixiviated three times for 30 minutes with an aqueous 6% solution of sodium carbonate at a temperature of 30° C. by keeping the proportion and weight of dust to lixiviating solution equal to 1:5. The residue filtered off after lixiviation contains about 10% by weight of $Al_2O_3$, which denotes, that the self-decomposed dust was lixiviated in 70% by weight. As a result thereof it gives 63% by weight of $Al_2O_3$ contained in the processed metallurgical slag. The solution of sodium metaaluminate, obtained after filtration, prior to previous removal all impurities therefrom, is subjected to a hydrolysis process using gases containing carbon dioxide. Under influence of the reaction proceeding with carbonic acid anhydride from the solution of sodium metaaluminate is evolved a crystalline aluminum hydroxide which after filtration and washing with water, is calcined to aluminum oxide at a temperature of 1200° C. In this manner the aluminum oxide is obtained which has following chemical composition:

moisture—0.008%
calcination losses—0.230%
$Al_2O_3$—99.490%
$SiO_2$—0.022%
$Fe_2O_3$—0.027%
$TiO_2$—0.007%
$Na_2O$—0.130%
$P_2O_5$—0.006%
$V_2O_5$—0.008%

It entirely does not contain any noxious trace contaminants (impurities) with chromium, manganese, cupric, lead or zinc oxides, which is its additional advantage in the relation to the oxide obtained by other methods.

The aluminum oxide obtained is characterized by high quality corresponding to the required standards for the metallurgy of aluminum. The content in the resulting aluminum oxide of the fraction with a grain dimension above 60 microns exceeds 65%, whereas those below 5 microns is approximately 8%. The bulk density of aluminum oxide is about 800 g/l. The residue after lixiviation in the quantity of 36.5% by weight is mixed with:

sand in the quantity of 12.0% by weight
limestone in a quantity of 50.0% by weight
pyrite cinders in a quantity of 1.5% by weight Moreover, these amounts are given as recalculated based on the calcination state.

This raw material composition is then burnt in a rotary kiln, at a temperature of 1400° C., resulting in a Portland clinker of following composition of its main components:

$3CaO.SiO_2$—67% by weight
$2CaO.SiO_2$—9% by weight
$4CaO.Al_2O_3.Fe_2O_3$—10% by weight
$3CaO.Al_2O_3$—9% by weight The proportion of Portland cement quantitatively produced from this composition of raw materials to the aluminum oxide obtained is 11.5:1. The clinker after grinding with 5% by weight of gypsum additive to a specific surface of 3300 cm$^2$/g corresponds to the quality of Portland cement "400", according to the I.S.O. standard.

EXAMPLE II

The metallurgical slag, cooled and kept at temperature 600° C., as it was given in Example I, is ground in a vibration crusher having a vibration frequency of 2500 per minute to grains with a maximum diameter of 20 mm. Subsequently, the ground slag is directed to a vibration slag spout with a vibration frequency of 5000 per minute, as result of which takes place a self-decomposition of the slag containing 95% by weight, which indicates, that on the sieve of mesh side length 2 mm remains residues of 5% by weight of the material. The content of grains with dimensions from 0 to 30 microns in self-decomposed screened dust is about 55% by weight. The self-decomposed dust screened through the sieve is then subjected to lixiviation as in Example I. The residue is filtered off after lixiviation, and contains about 8.5% by weight of $Al_2O_3$, which indicates, that the self-decomposed material was lixiviated in 75% by weight. It gives the effective recovery in 71% by weight of $Al_2O_3$ from the total amount of cooled metallurgical slag. The chemical processing of the filtered off solution of sodium aluminate to aluminum oxide is carried out as given in Example I. The aluminum oxide is characterized by the same properties, as those of aluminum oxide obtained in Example I. The residue after lixiviation in a quantity of 50% by weight is then mixed with:

sand in the amount of—10.0% by weight
limestone in the amount of—38.5% by weight
pyrites cinders in the amount of—1.5% by weight The raw material composition is fired to form the Portland clinker under the conditions given in Example I. The proportion of Portland clinker produced from this composition to the quantity of obtained alumina is 7.5:1.

EXAMPLE III

The metallurgical slag, cooled and kept at temperature 600° C., as given in Example I is subjected to the action of ultrasounds at a frequency 20 kHz, which gives the entire self-decomposition of slag, it being in 100% by weight. The grain content with dimensions of between 0 and 30 microns in screened self-decomposed dust, is about 80% by weight. The self-decomposed dust is then subjected to lixiviation in the manner given in Example I. The residue after lixiviation filtered off contains about 7% by weight of $Al_2O_3$ which indicates, that the self-decomposed dust was lixiviated in 80% by weight. It results effectively in the recovery of 80% by weight of $Al_2O_3$ from their total amount of cooled metallurgical slag. The chemical processing of the solution of sodium aluminate filtered off to aluminum oxide is carried out as given in Example I. The obtained aluminum oxide has the same properties as those of aluminum oxide resulting in Example I.

The residue after lixiviation in the amount of 65% by weight is then mixed with:

sand in the amount of—8.0% by weight
limestone in the amount of—25.5% by weight
pyrite cinders in the amount of—1.5% by weight Subsequently, the Portland clinker is burnt from this composition of raw materials in the manner given in Example I.

The quantitative proportion of the amount of Portland clinker produced from this composition of raw materials to the amount of obtained aluminum oxide is 5:1.

From the residue filtered off, after lixiviation, containing about 7% by weight of $Al_2O_3$ is obtained a high-alite Portland clinker. The residue after lixiviation in the amount of 87% by weight is mixed with sand in amount of 3% by weight, and thereafter, from the composition of raw material the high-alite clinker quality of the mark "500" with following composition, is burnt:

$3CaO.SiO_2$—73% by weight
$3CaO.Al_2O_3$—17% by weight
$2CaO.Fe_2O_3$—4.0% by weight The proportion of the quantity of high-alite Portland clinker, produced from the set to the amount of burnt aluminum oxide is 3.5:1. The clinker after grinding, with addition of 5% by weight of gypsum to a specific surface 4800 $cm^2/g$ corresponds to the quality of quick-hardening Portland cement "500", according to I.S.O. standard.

We claim:

1. A method for producing aluminum oxide, which comprises subjecting smelted metallurgical slag to cooling and then eventually effecting its self-decomposition by simultaneous action of ultrasound or vibration of high frequency, accelerating the formation in a glassy vitreous phase of calcium aluminates for easy lixiviating with aqueous solutions of soda of a polymorphous, crystalline, high-temperature form of calcium aluminate, $12CaO.7Al_2O_3$, and, subsequently, after its self-decomposition lixiviating the product with an aqueous solution of soda, recovering aluminum oxide from the lye liquors after extraction, and burning the residue after the lixiviation to standard or high-alite Portland clinker, maintaining the lowest proportion between the quantity of clinker obtained and aluminum oxide produced, in relation to the quantity of produced aluminum oxide.

2. The method according to claim 1, wherein smelted metallurgical slag is used, which is produced during the process of iron melting at a temperature of about 1500° C.

3. The method according to claim 2, wherein a slow cooling is carried out at temperature below 1350° C., not faster than 10° C. per minute.

4. The method according to claim 3 wherein the slag, after cooling to a temperature below 700° C., is subjected to the action of ultrasound or vibrations of high frequency.

5. The method according to claim 4 wherein the high temperature polymorphous form, $12CaO.7Al_2O_3$, is lixiviated at a temperature below 50° C.

6. The method according to claim 5 wherein the lixiviation is carried out with an aqueous solution of sodium carbonate of a concentration less than 10% by weight.

7. The method according to claim 6, wherein the residue after lixiviation, and before burning, is mixed with complementary additives used for the production of Portland cement clinker.

* * * * *